US008610053B2

(12) United States Patent
Yamada et al.

(10) Patent No.: US 8,610,053 B2
(45) Date of Patent: Dec. 17, 2013

(54) INDUCTIVELY COUPLED PLASMA MS/MS MASS ANALYZER

(71) Applicant: Agilent Technologies, Inc., Loveland, CO (US)

(72) Inventors: Noriyuki Yamada, Tokyo (JP); Jun Kitamoto, Tokyo (JP); Takeo Kuwabara, Tokyo (JP)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 13/734,378

(22) Filed: Jan. 4, 2013

(65) Prior Publication Data

US 2013/0175442 A1 Jul. 11, 2013

(30) Foreign Application Priority Data

Jan. 6, 2012 (JP) .................................... 2012-1616

(51) Int. Cl.
*B01D 59/44* (2006.01)

(52) U.S. Cl.
USPC ........... 250/281; 250/282; 250/283; 250/287; 250/288; 250/289; 250/290; 250/291; 250/292

(58) Field of Classification Search
USPC ................................. 250/281–283, 287–292
See application file for complete search history.

(56) References Cited

U.S. PATENT DOCUMENTS 8,481,923 B1 * 7/2013 Kitamoto ...................... 250/281

FOREIGN PATENT DOCUMENTS

WO 0016375 A1 3/2000

OTHER PUBLICATIONS

Douglas, D.J.; Some Current Perspectives on ICP-MS; Canadian Journal of Spectroscopy; vol. 34, No. 2, 1989, pp. 38-49.

* cited by examiner

*Primary Examiner* — Jack Berman
*Assistant Examiner* — Meenakshi Sahu

(57) ABSTRACT

An inductively coupled plasma MS/MS mass analyzer (ICP-MS/MS) may include a first vacuum chamber which draws plasma containing an ionized sample into vacuum, a second vacuum chamber which includes a device or means which extracts and guides ions as an ion beam from the ions output from the first vacuum chamber, a third vacuum chamber which has a first ion optical separation device or means, a fourth vacuum chamber which has a cell into which reaction gas is introduced, and a fifth vacuum chamber which has a second optical separation device or means and a detector, wherein the second vacuum chamber and third vacuum chamber are individually evacuated.

12 Claims, 6 Drawing Sheets

INDUCTIVELY COUPLED PLASMA MS/MS MASS ANALYZER

RELATED APPLICATIONS

This application claims priority to Japanese Patent Application No. 2012-1616, titled "INDUCTIVELY COUPLED PLASMA MS/MS MASS ANALYZER", filed Jan. 6, 2012, the content of which is incorporated herein by reference in its entirety.

TECHNICAL FIELD

The present invention relates to a novel differential pumping configuration in an inductively coupled plasma MS/MS mass analyzer (ICP-MS/MS).

BACKGROUND

Although there have been no examples of commercially produced inductively coupled plasma MS/MS mass analyzers (ICP-MS/MS) up to now, there have been many examples that have been constructed and used in experimental research. An ICP-MS/MS is made up of an inductively coupled plasma (ICP) ion source and an MS/MS mass analyzer (MS/MS) connected to it. The inductively coupled plasma ion source produces plasma containing the sample to be analyzed. The MS/MS mass analyzer is constructed from an interface and an ion lens set, a collision/reaction cell, two mass filters respectively provided on the front end and back end sandwiching the cell, and a detector such as an electron multiplier. The two mass filters are means of separating and extracting ions. For example, they separate certain ions in the ion beam according to mass-to-charge ratio using a quadrupole mass filter. The collision/reaction cell introduces a reaction gas having a relatively low molecular weight such as hydrogen, and by collision and reaction of the reaction gas molecules with polyatomic molecule ions in the ion beam introduced from the front-end mass filter, it selectively neutralizes them and prevents interference with the measurement signal.

By such a configuration, the plasma produced by the inductively coupled plasma (ICP) ion source is introduced into the mass analyzer (MS/MS) as an ion beam via the interface, and ions of a prescribed mass-to-charge ratio are separated by the front-end mass filter and sent to the collision/reaction cell. There is the possibility of the ion beam output by the front-end mass filter containing multiple species of ions having the same mass-to-charge ratio. This ion beam collides and reacts with the reaction gas in the cell, and polyatomic molecule ions having a smaller or larger mass-to-charge ratio are produced, and are sent to the back-end mass filter. The back-end mass filter further separates the ions that are the target of measurement according to a prescribed mass-to-charge ratio, and sends them to the detector.

Thus, the ICP-MS/MS is an instrument which efficiently separates measurement target ions from interfering ions using two mass filters and a cell, and quantifies them. In "Some Current Perspectives on ICP-MS," D. J. Douglas, Canadian Journal of Spectroscopy, Volume 34, No. 2, 1989 ("Non-patent Reference 1"), the content of which is incorporated herein by reference in its entirety, the article introduces an experiment which demonstrates that ions input to the detector can be selectively reduced in number by utilizing an ion molecule reaction in an ICP-MS/MS. That is to say, terbium ions ($Tb^+$, mass number 159), cerium ions ($Ce^+$, mass number 140, 142) and cerium oxide ions ($CeO^+$, mass number 156, 158) are sent from the ion source through the front-end mass filter and are introduced into the collision/reaction cell which uses oxygen ($O_2$) as a reaction gas. In the cell, $Tb^+$ and $Ce^+$ react with $O_2$ to form $TbO^+$ (mass number 175) and $CeO^+$ (mass number 156, 158), which are sent to the back-end mass filter. As a result, by operating the back-end mass filter at a mass-to-charge ratio that is 16 higher than the front-end mass filter, terbium and cerium can be respectively detected at a mass number that reacts to $TbO^+$ and $CeO^+$. On the other hand, since almost no $CeO_2^+$ (mass number 172, 174) is formed in the cell, cerium based oxide ions are limited to $CeO^+$. As a result, almost no $CeO_2^+$ of mass number 172 and 174 pass through the back-end filter. That is, the $CeO^+$ signal can be dramatically reduced with respect to the $Tb^+$ signal by utilizing the difference in ion molecule reactions in the cell. As demonstrated by this experiment, ions can be selectively reduced in number using ion molecule reactions in an ICP-MS/MS, and thus, based on this principle, an ICP-MS/MS can reduce the number of interfering ions with respect to measurement target ions.

An ICP-MS/MS must maintain vacuum inside the analysis chamber. International Publication No. WO 00/16375 (Japanese Unexamined Translation of PCT Application 2002-525801) ("Patent Reference 1"), the content of which is incorporated herein by reference in its entirety, is an example which illustrates a pumping configuration for doing so.

As described above, in an ICP-MS/MS, two vacuum chambers in which quadrupoles are arranged are provided before and after the vacuum chamber that holds the cell into which reaction gas is supplied. For reference, FIG. 2 of Patent Reference 1 is appended here as FIG. 6. Patent Reference 1 relates to a vacuum system of an ICP-MS/MS, and discloses that a vacuum chamber which holds a conventional extraction electrode and a collision/reaction cell is divided into a first vacuum chamber 6 which has an extraction electrode and a quadrupole, and a second vacuum chamber 20 which has a collision/reaction cell, and the pressure of the first vacuum chamber 6 is from about $1\times10^{-2}$ Pa to 1 Pa, typically about 1 to $2\times10^{-1}$ Pa, and the pressure of the second vacuum chamber 20 is about 1 to $2\times10^{-2}$ Pa. A third vacuum chamber 33 is provided on the back end of the second vacuum chamber 20 and has a quadrupole mass filter 37 and a detector 38, and pressure of the third vacuum chamber is about $1\times10^{-4}$ Pa. The first vacuum chamber 6 is made up of a region 14 in which the extraction electrode 8 is housed and a region 15 in which the quadrupole 17 is housed. These regions are vacuum-pumped by a turbomolecular pump as one vacuum stage. The vacuum chambers are connected to each other by orifices 19 and 32 having a diameter of about 2 to 3 mm, but these regions 14 and 15 are connected by an orifice 11 which has a relatively large diameter of about 20 mm so that they have the same pressure. However, such a pumping configuration is a problem according to the findings of the present inventors.

That is to say, as described above, the vacuum pumping configuration proposed in Patent Reference 1 is designed such that the pressure of the first vacuum chamber 6 is about 1 to $2\times10^{-1}$ Pa. Further, in actuality, the first vacuum chamber 6 is a second vacuum stage which is differentially vacuum-pumped from the ion source 1 which is at atmospheric pressure, and its pressure can only be reduced to about $1\times10^{-2}$ Pa at best. Incidentally, since the potential applied to the quadrupole 17 consists of high-voltage alternating current of relatively high frequency, normally several MHz or several kV, superimposed over direct current of several hundred volts, there is risk of background noise being high when an ICP-MS/MS is operated at such voltage. Further, to ensure that the quadrupole has sufficient mass selectivity and mass resolution, ion flight distance of about the same length as the quadrupole must be provided. However, the mean free path of ions depends on the ion species. For example, assuming collisions between Ar ions and Ar gas molecules, it is shorter than 30 cm under such pressure condition. For this reason, mass selectivity and mass resolution may be insufficient, and there is also that concern that sensitivity decreases due to collisions between ions and gas molecules. Conversely, if the length of the quadrupole is shortened in order to prevent a decrease in sensitivity, the mass resolution of the quadrupole itself is sacrificed, and there is the problem that analysis performance of the ICP-MS/MS is reduced due to an increase in spectral interference.

Therefore, there is a need for further improvements in vacuum pumping configurations utilized in ICP-MS/MS systems.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

In some embodiments, the present invention solves the problems described above by providing a novel differential vacuum pumping configuration used in an ICP-MS/MS, and its objective is to sufficiently bring out the features of an inductively coupled plasma mass analyzer, which can detect trace amounts of metal ions with high sensitivity.

According to some embodiments, the inductively coupled plasma MS/MS analyzer (ICP-MS/MS) of the present invention comprises a first vacuum chamber which draws plasma containing a sample element produced at atmospheric pressure into vacuum and also outputs it into a back-end vacuum chamber; a second vacuum chamber which includes a device or means which extracts ions containing the analysis target as a beam from the plasma output from the first vacuum chamber and also converges and guides it; a third vacuum chamber which is connected to the second vacuum chamber and has a first ion optical separation device or means; a fourth vacuum chamber which is connected to the third vacuum chamber and has a cell into which reaction gas is introduced; and a fifth vacuum chamber which is connected to the fourth vacuum chamber and has a second optical separation device or means and a detector. The first and second ion optical separation device or means are typically quadrupole multifilters (quadrupoles) having four rod electrodes. A quadrupole is also contained in the collision/reaction cell. Note that the rod electrodes in the cell are not limited to a quadrupole, and may be a multipole made up of six or eight rod electrodes.

The five vacuum chambers of the ICP-MS/MS of the present invention are each evacuated, which is novel as a differential pumping configuration, but the present invention is particularly distinguished from prior art in the fact that the second vacuum chamber and third vacuum chamber are individually evacuated. That is, the second vacuum chamber, which houses an extraction electrode and ion lens as device or means for extracting, converging and guiding the ion beam, and the third vacuum chamber, which houses the first quadrupole, are divided by a partition having a small orifice about 2-3 mm in diameter. By pumping each chamber by turbomolecular pumps, the inflow rate of Ar gas components from the ion source into the third vacuum chamber is reduced to about $1\times10^{-2}$ sccm. Note that this partition can also be operated as an ion lens by applying voltage. As a result, the distance between the partition that separates the second and third vacuum chambers and the mass filter can be reduced to about 1 mm to 7 mm, the need for an ion lens provided between that partition and the mass filter can be eliminated, and ion loss can be reduced. As a result, the effects described later are obtained, such as the pressure in the third vacuum chamber being reduced by two orders of magnitude compared to prior art and the ion mean free path being lengthened.

The first vacuum chamber is normally evacuated by a rotary pump, and the second through fifth vacuum chambers are evacuated by turbomolecular pumps or oil diffusion pumps. The turbomolecular pumps may be the split flow type—that is, a turbomolecular pump having a plurality of inlets (suction orifices) in one pump. However, with the split flow type, the pressure at the inlet on the downstream side ends up being higher than the pressure of the inlet on the upstream side. Therefore, even when a split flow turbomolecular pump is used in the ICP-MS/MS of the present invention, attention is required because if the partial pressure of gas in the front-end region of the collision/reaction cell becomes high, there is thought to be risk of electric discharge and severely reduced sensitivity. The pressure in the vacuum chamber is typically maintained at about 0.1 Pa to 0.5 Pa in the second vacuum chamber which contains an extraction electrode and ion lens, and is maintained at about $1\times10^{-4}$ Pa to $1\times10^{-2}$ Pa in the third vacuum chamber which houses the first quadrupole, which is lower than in the second vacuum chamber. The pressure in the fourth vacuum chamber is about $1\times10^{-3}$ Pa to 0.2 Pa, and the pressure in the fifth vacuum chamber is about $1\times10^{-4}$ Pa to $5\times10^{-3}$ Pa.

An embodiment of the present invention can be configured such that the firth vacuum chamber is connected to the third vacuum chamber via a duct, and in this case, these vacuum chambers are at the same pressure. In the present invention, as described above, the third chamber and the fifth chamber which house quadrupoles are respectively provided before and after the fourth vacuum chamber which houses the collision/reaction cell, but by being configured such that the third vacuum chamber is evacuated separately from the second vacuum chamber, unlike prior art, the risk of electric discharge and reduced sensitivity in these quadrupoles, which serve the functions of ion guiding and mass selection, is eliminated. In this case, there is the additional advantage that it does matter if the third vacuum chamber and fifth vacuum chamber are vacuum-pumped by individual turbomolecular pumps, and the number of turbomolecular pumps, which are rotated by rotors at high speed on the order of tens of thousands of rpm, can be reduced by connecting these vacuum chambers via a duct.

In specific applications of the present invention, the second vacuum chamber and third vacuum chamber may be evacuated by a single split flow turbomolecular pump, and the third vacuum chamber and fourth vacuum chamber or the fourth vacuum chamber and fifth vacuum chamber may be evacuated by a single split flow turbomolecular pump, and furthermore, a configuration in which these are combined and connected by the aforementioned duct may be used.

Note that the rotary pump used in rough pumping of the first vacuum chamber may also be used as a backing pump in combination for pumping foreline of the turbomolecular pumps or oil diffusion pumps that pump the second through fifth vacuum chambers.

According to the present invention, since the pressure of the third vacuum chamber which houses a quadrupole can be sufficiently reduced, the mean free path of the ions is lengthened, and therefore there is almost no loss in sensitivity due to collision between ions and gas molecules in the third vacuum chamber. Also, since the length of the quadrupole is sufficient, mass selectivity and mass resolution can be improved while reducing sensitivity loss. Additionally, the quantity of unvaporized sample matrix and neutral molecules introduced into the third vacuum chamber can be reduced, and as a result, there is also the effect that the burden of maintenance can be reduced because the quadrupole and nearby ion lens are less contaminated.

Additionally, if the third and fifth vacuum chambers are connected by a duct as described above, the number of turbomolecular pumps, which are less reliable than other parts and require overhaul such as bearing replacement every few years due to high-speed rotation, can be reduced or smaller pumps can be used. This enables cost reduction, makes assembly of the mass analyzer easier, reduces the labor required for maintenance, and improves reliability due to a reduction in frequency of pump failures.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
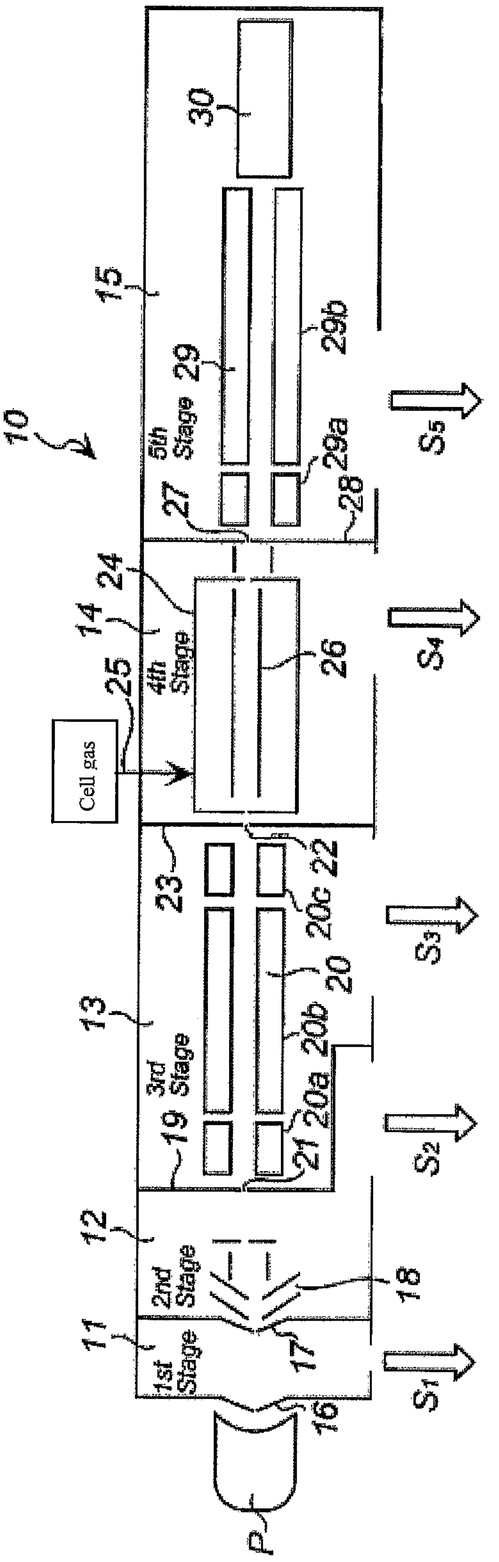
FIG. 1 is a schematic diagram illustrating the basic concept of the novel differential pumping configuration of the ICP-MS/MS according to the present invention.

A basic embodiment of the inductively coupled plasma MS/MS mass analyzer according to the present invention is illustrated in FIG. 1. As previously described, the difference from prior art as described in Patent Reference 1 is the fact that the vacuum chamber that houses the extraction electrode and the vacuum chamber that houses the quadrupole connected to it are evacuated as separate vacuum stages.

The inductively coupled plasma MS/MS mass analyzer 10 contains a plasma torch not illustrated in the drawings, for producing inductively coupled plasma P into which a sample is introduced by spraying. As is known, a coil connected to a high-frequency power supply is arranged near the plasma torch, and the plasma P is generated by operation thereof. In the apparatus 10, five vacuum chambers 11-15 which can be connected to each other are arranged. The first vacuum chamber 11 is adjacent to the plasma P, and has an interface structure that includes a sampling cone 16 and a skimmer cone 17. Some of the plasma P, which contains ions of the sample produced by the plasma torch, is extracted in the form of an ion beam via the interface structure. Since the outside of the sampling cone 16 is at atmospheric pressure, the first vacuum chamber is at a relatively high pressure, but as indicated by S1, its pressure is reduced by a roughing pump such as, for example, a rotary pump via an exhaust plumbing. Note that the exhaust plumbing includes a valve which is operated when the apparatus is started and maintained in the open state during the analysis operation.

The plasma containing ionized sample sucked into the first vacuum chamber 11 passes through the orifice of the skimmer cone 17 and is led into the second vacuum chamber 12. In the second vacuum chamber 12, ion optical parts such as, for example, an extraction electrode and ion lens 18 for guiding the ion beam, are arranged behind the skimmer cone 17. Note that it does not matter if it is something other than an extraction electrode, provided that it is an ion optical device for converging ions output from the interface structure by the first vacuum chamber 11 and carrying them to the back end (for example, a quadrupole ion deflector like that used in NexION® made by Perkin Elmer). The second vacuum chamber 12 is pumped to a moderate degree of vacuum of about 0.1 Pa to 0.5 Pa by, for example, a turbomolecular pump or oil diffusion pump, as indicated by S2.

At the back end of the second vacuum chamber 12, a third vacuum chamber 13, which is separated from the second vacuum chamber 12 by a partition 19, is provided. A quadrupole mass filter 20 is housed inside the third vacuum chamber, which improves mass selectivity and mass resolution and carries the ion beam into the fourth vacuum chamber, and also prevents plasma gas and carrier gas and so forth from being sent in. The quadrupole mass filter 20 is made up of a quadrupole mass filter body 20*b* and ion guides 20*a* and 20*c* respectively provided at the front end and back end thereof. The third vacuum chamber 13 is pumped separately from the second vacuum chamber 12 to a high degree of vacuum of, for example, about $1\times10^{-4}$ Pa to $2\times10^{-2}$ Pa, as indicated by S3. However, there is no problem if these vacuum chambers are individually evacuated using the respective inlets of a split flow turbomolecular pump. That is, the second vacuum chamber 12 can be connected to the low vacuum-side inlet of the split flow turbomolecular pump, and the third vacuum chamber 13 can be connected to its the high vacuum-side inlet. An orifice 21 is provided in the partition 19 that separates the second vacuum chamber 12 and third vacuum chamber 13, and a gate valve (not illustrated in drawings), which closes when operation stops, is provided on the front end of the partition 19. Because pressure is sufficiently low, the distance between the partition 19 and the quadrupole mass filter 20 is a short 1 mm. The partition 19 serves as an ion lens.

The fourth vacuum chamber 14 is separated from the third vacuum chamber 13 by a partition 23 which has an orifice 22. In this chamber, a collision/reaction cell 24 is placed, and reagent gas can be introduced as indicated by 25. As described with regard to Non-patent Reference 1, this type of cell is known, and it removes carrier gas and plasma gas as well as polyatomic molecules, which contain elements of auxiliary gas and generate interference in the mass spectrum, from the carried ion beam by causing a charge-transfer reaction with the reagent gas molecules. A multipole electrode like a quadrupole mass filter 26 is contained inside the cell 24. The fourth vacuum chamber 14 is pumped to pressure of, for example, about $1\times10^{-5}$ Pa to 0.2 Pa as indicated by S4, but in this case as well, it may be independently pumped by a turbomolecular pump or it may be pumped while sharing a split flow turbomolecular pump with another vacuum chamber.

In the final stage of the apparatus 10, a fifth vacuum chamber 15 is provided, separated from the fourth vacuum chamber by a partition 28 which has an orifice 27. A quadrupole mass filter 29 is provided in this chamber as a separation device or means for extracting ions that have a prescribed mass-to-charge ratio, and a detector 30 like an electron multiplier for detecting the extracted ions is arranged on the back side of the quadrupole mass filter 29. The quadrupole mass filter 29 is made up of an ion guide 29*a* and a quadrupole mass filter body 29*b*. The detector outputs a detection signal to a signal processing device or means provided externally to the apparatus 10. The fifth vacuum chamber 15 is evacuated to a high vacuum by a turbomolecular pump, as indicated by S5. The fifth vacuum chamber 15 can be evacuated to a pressure of about $1\times10^{-5}$ Pa to $2\times10^{-2}$ Pa, which is lower than the fourth vacuum chamber 14, but there are also cases where it is connected to the third vacuum chamber 13 via a duct and they are maintained as the same pressure, as will be described later.

FIGS. 2 through 5 illustrate examples of specific arrangements of vacuum pumps based on the basic configuration of FIG. 1. In these drawings, the constituent elements inside the vacuum chambers of the apparatus 10 are the same as in FIG. 1 but are not illustrated for simplicity. The other constituent elements that are the same as in FIG. 1 are given the same reference numerals.

Figure 2:
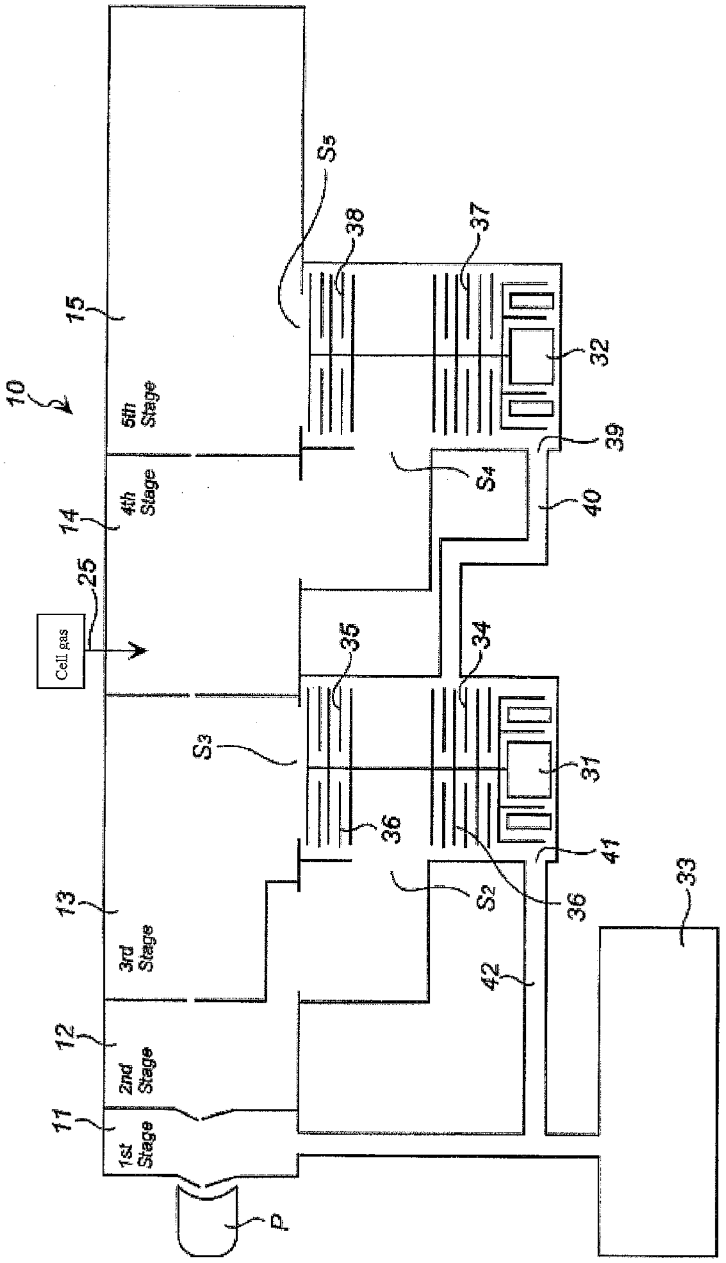
FIG. 2 is a schematic diagram of the novel differential pumping configuration of the ICP-MS/MS of an embodiment of the present invention.

FIG. 2 illustrates an example in which two split flow turbomolecular pumps 31 and 32 are used. As shown in the drawing, the first vacuum chamber 11 is evacuated by a rotary pump 33, and the second vacuum chamber 12 and third vacuum chamber 13 are both pumped by a split flow turbomolecular pump 31. That is to say, the second vacuum chamber 13 and the third vacuum chamber 13 are respectively connected by the inlet S2 and the inlet S3 to a low vacuum-side stage 34 and a high vacuum-side stage 35 which connect in the axial direction of the split turbomolecular pump 31. The low vacuum-side stage 34 and the high vacuum-side stage 35 each contain a plurality of rotary blades 36 capable of turning within the horizontal-direction surface. Note that, as is known, there are also turbomolecular pumps having a configuration in which the axial direction faces the horizontal-direction surface, and the rotors turn within the vertical-direction surface, and these may be similarly used in the present invention. According to the structure of the embodiment in FIG. 2, the third vacuum chamber 13 is reduced in pressure by the action of both the rotor group positioned in the low vacuum-side stage 34 and the rotor group positioned in the high vacuum-side stage 35, whereas the second vacuum chamber 12 is reduced in pressure only by the rotor group positioned in the low vacuum-side stage 34. Therefore, the second vacuum chamber 12 and third vacuum chamber 13 can be individually evacuated to the respective desired degrees of vacuum.

Similarly, the fourth vacuum chamber 14 and fifth vacuum chamber 15 are both evacuated by a split flow turbomolecular pump 32. The fourth vacuum chamber 14 and the fifth vacuum chamber 15 are respectively connected by the inlet S4 and the inlet S5 to a low vacuum-side stage 37 and a high vacuum-side stage 38 which connect in the axial direction of the split turbomolecular pump 32. Further, in the configuration in FIG. 2, a backing port 39 of the split flow turbomolecular pump 32 is connected along the low vacuum-side stage 34 of the split flow turbomolecular pump 31 via an exhaust plumbing 40, and a backing port 41 of the split flow turbomolecular pump 31 is connected to the rotary pump 33 via an exhaust plumbing 42. This rotary pump 33 functions as a foreline pump for evacuating the split flow turbomolecular pumps 31 and 32.

Figure 3:
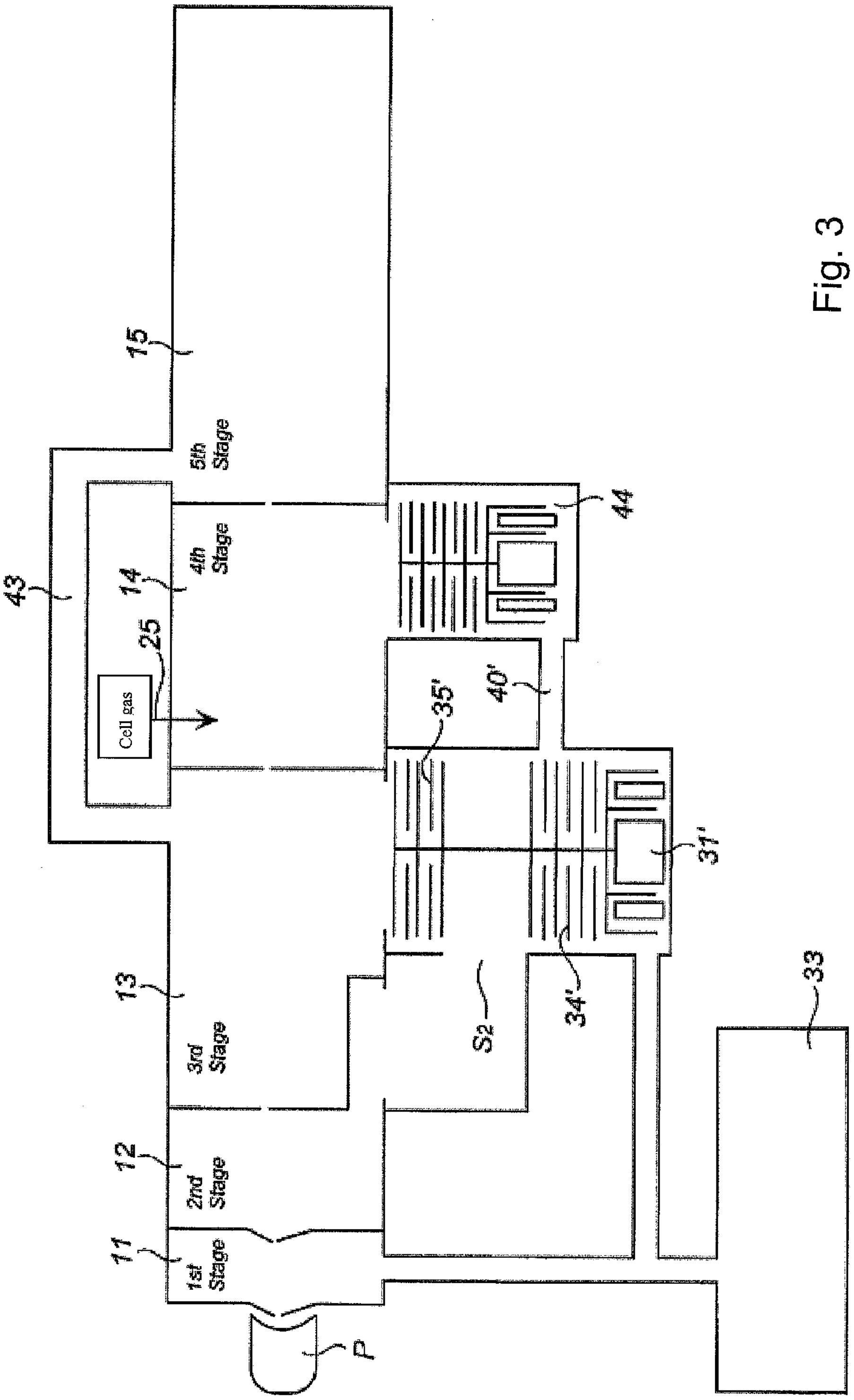
FIG. 3 is a schematic diagram of the novel differential pumping configuration of the ICP-MS/MS of another embodiment of the present invention.

FIG. 3 is a schematic diagram illustrating an embodiment of a configuration in which the third vacuum chamber 13 and fifth vacuum chamber 15 are connected via a duct 43. Similar to the embodiment in FIG. 2, the second vacuum chamber 12 and third vacuum chamber 13 are both evacuated by a split flow turbomolecular pump 31. That is to say, the second vacuum chamber 12 and the third vacuum chamber 13 are both evacuated by a split flow turbomolecular pump 31' similar to FIG. 2, and the third vacuum chamber 13 is connected to its high vacuum-side stage 35', and the second vacuum chamber 12 is connected to its low vacuum-side stage 34'. However, another turbomolecular pump 44, which, unlike the turbomolecular pump 32 of FIG. 2, is not of the split flow type, is connected only to the fourth vacuum chamber 14. Therefore, it is more advantageous than the embodiment in FIG. 2 from a cost perspective. As the duct 43, a hose such as bellows may be used, or a duct may be provided in the chamber or the manifold of the turbomolecular pump. However, since the pressure rise of the fifth vacuum chamber 15 must be reduced as much as possible, particularly when the reagent gas 25 is introduced, it is desirable to make the duct conductance as large as possible by making the cross-sectional area of the duct as large as possible and the length of the duct as short as possible. The backing port of the turbomolecular pump 44 is connected along the low vacuum-side stage 34' of the split flow turbomolecular pump 31' via an exhaust plumbing 40'.

Figure 4:
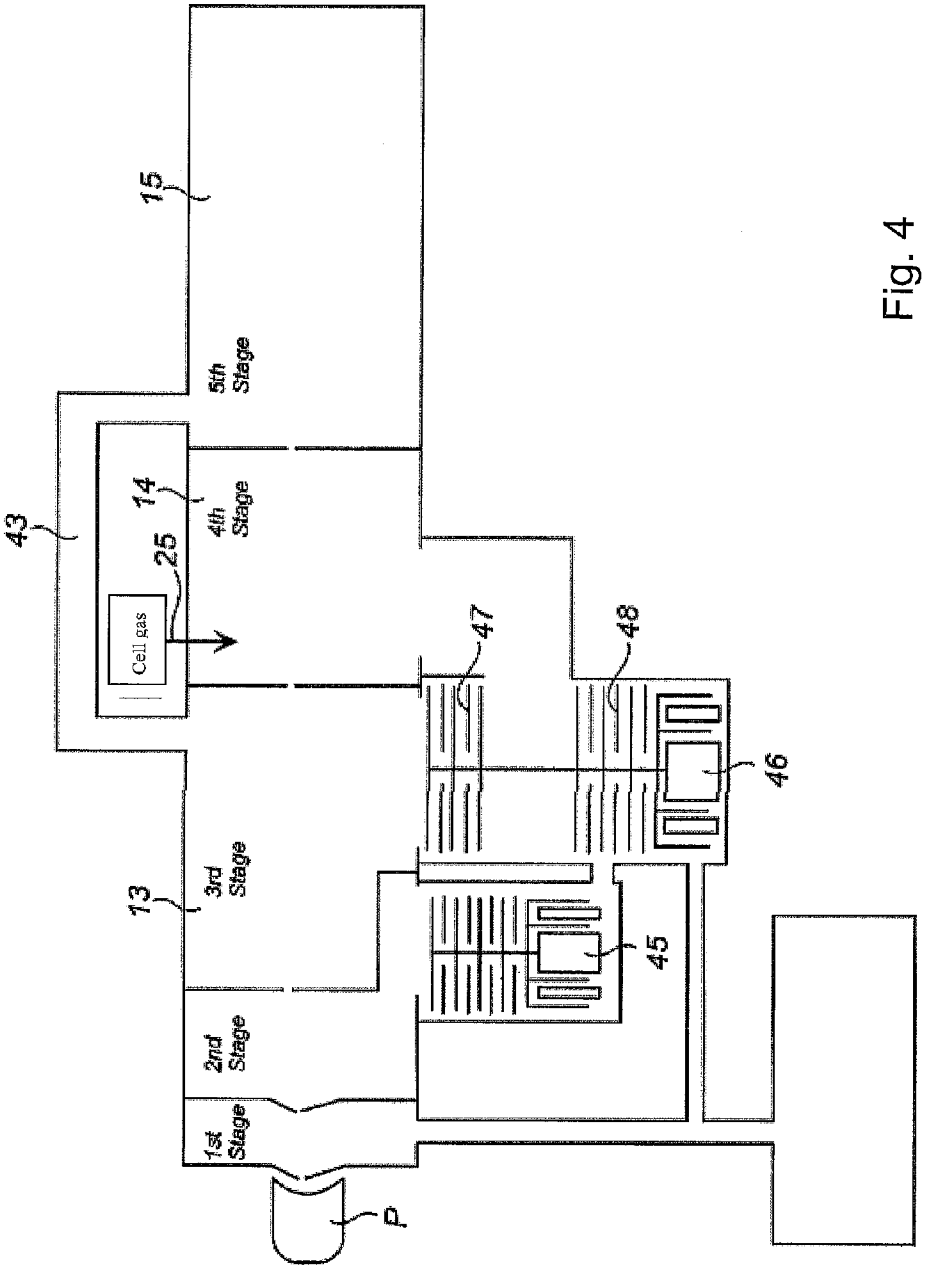
FIG. 4 is a schematic diagram of the novel differential pumping configuration of the ICP-MS/MS of yet another embodiment of the present invention.
Figure 5:
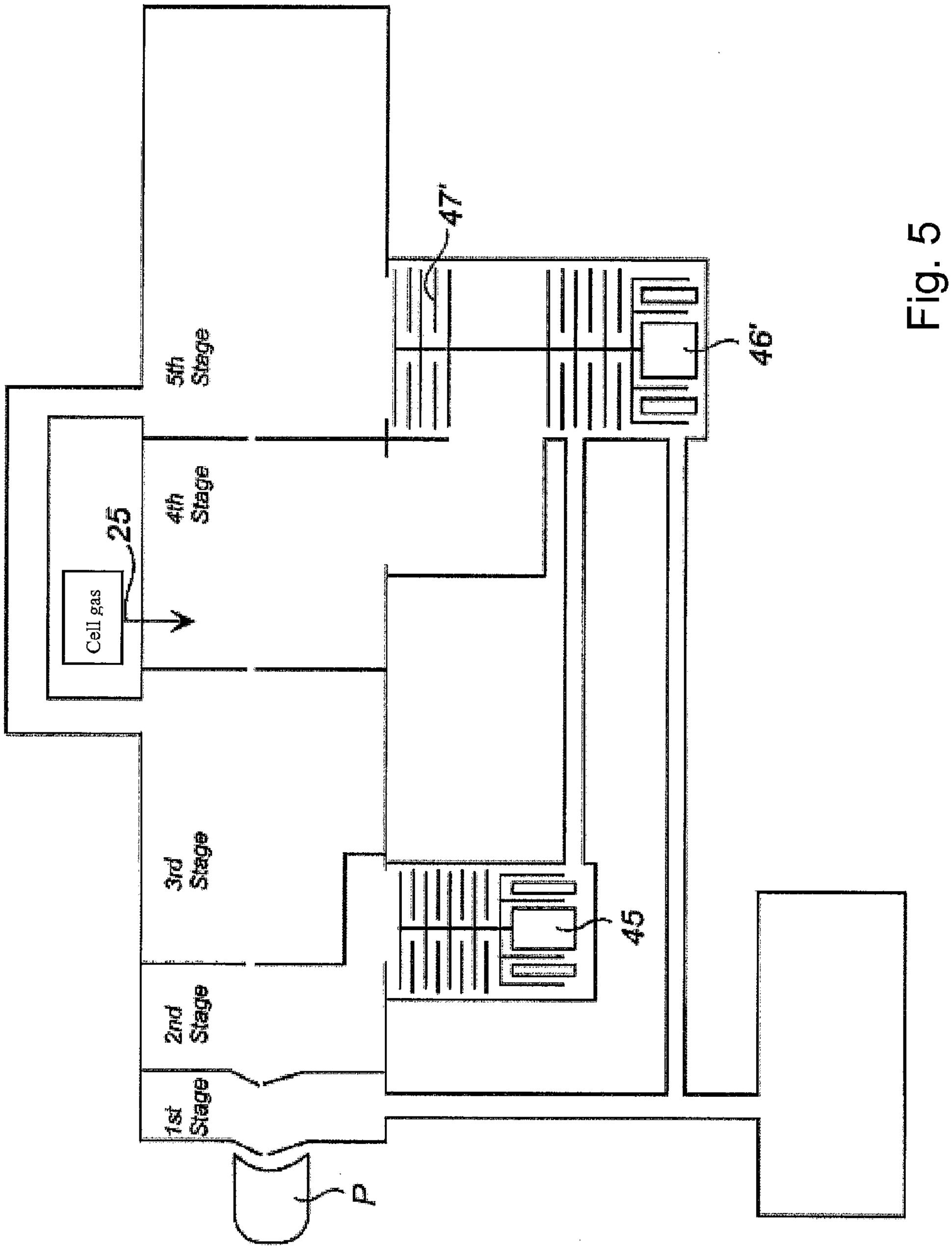
FIG. 5 is a schematic diagram of the novel differential pumping configuration of the ICP-MS/MS of yet a further embodiment of the present invention.
Figure 6:
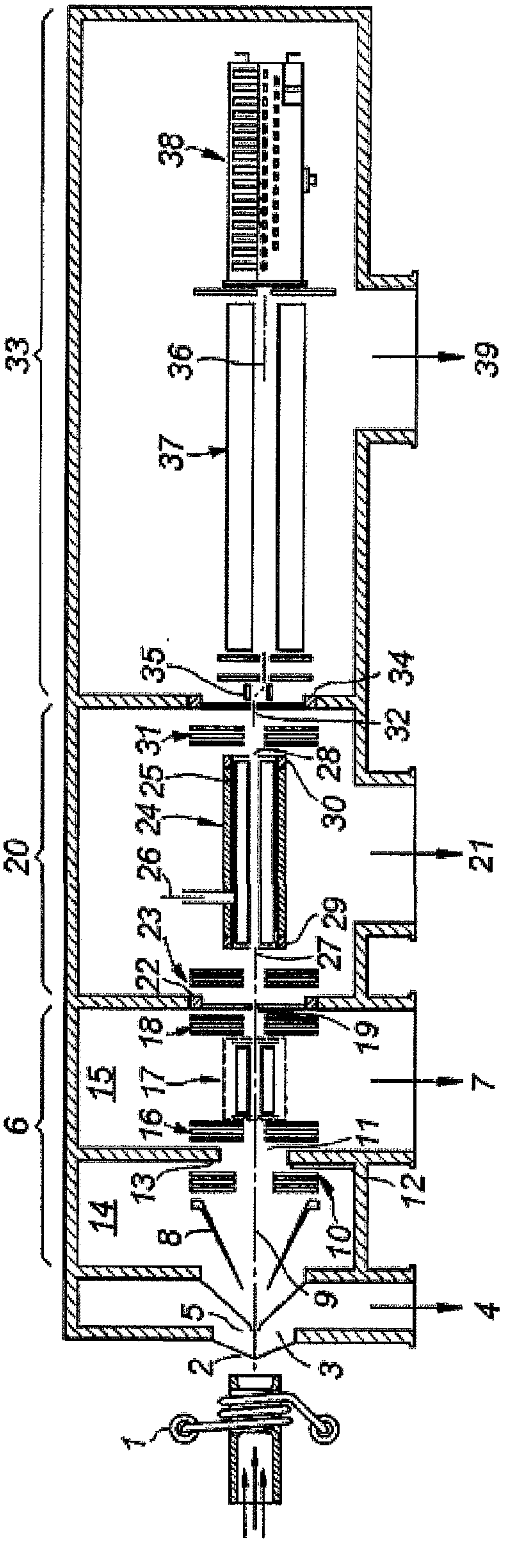
FIG. 6 is a cross-sectional diagram illustrating the configuration of the conventional ICP-MS/MS disclosed in FIG. 2 of Patent Reference 1.

FIG. 4 illustrates another configuration in which the third vacuum chamber 13 and fifth vacuum chamber 15 are connected via the duct 43. In this example, the second vacuum chamber 12 is evacuated by an independent turbomolecular pump 45, and the third vacuum chamber 13 and fourth vacuum chamber 14 are evacuated by a split flow turbomolecular pump 46. Specifically, the third vacuum chamber 13 is connected to a high vacuum-side stage 47, and the fourth vacuum chamber 14 is connected to a low vacuum-side stage 48. FIG. 5 shows a configuration similar to that of FIG. 4, in which a high vacuum-side stage 47' of a split flow turbomolecular pump 46' is connected to the fifth vacuum chamber 15.

EXAMPLES

An inductively coupled plasma MS/MS mass analyzer having the basic five-stage differential pumping configuration of FIG. 1 was prepared. The quadrupole in the third vacuum chamber 13 was set to thallium 205, and signal intensity of 1 ppb was measured. The quadrupole in the fifth vacuum chamber 15 was operated as an ion guide, and gas was not introduced into the collision/reaction cell 24. For comparison, the same measurement was performed with a four-stage differential pumping configuration by putting a cap on the pump inlet S2, but an orifice with an area of approximately 600 $mm^2$ was provided in the partition 22 as a gas relief path. The measurement results for signal intensity and pressure in the second vacuum chamber are shown in Table 1.

TABLE 1

| | Signal intensity of 1 ppb Tl (205 u) [count/0.1 sec] | Pressure of vacuum chamber [Pa] |
|---|---|---|
| 5-stage differential pumping | 19190 | $2.5\times10^{-3}$ |
| 4-stage differential pumping | 12230 | $2.9\times10^{-2}$ |

| DESCRIPTION OF REFERENCE NUMERALS | |
|---|---|
| 10 | Inductively coupled plasma MS/MS mass analyzer |
| 11 | First vacuum chamber |
| 12 | Second vacuum chamber |
| 13 | Third vacuum chamber |
| 14 | Fourth vacuum chamber |
| 15 | Fifth vacuum chamber |
| 20, 26, 29 | Quadrupole mass filter |
| 24 | Collision/reaction cell |
| 31, 31', 32, 46, 46' | Split flow turbomolecular pump |
| 33 | Rotary pump |
| 43 | Duct |
| 44, 45 | Turbomolecular pump |

EXEMPLARY EMBODIMENTS

Exemplary embodiments provided in accordance with the presently disclosed subject matter include, but are not limited to, the following:

1. An inductively coupled plasma MS/MS mass analyzer comprising:

a first vacuum chamber which draws plasma containing a sample element produced at atmospheric pressure into vacuum and also outputs it into a back-end vacuum chamber;

a second vacuum chamber which includes a means which extracts ions containing the analysis target as a beam from the plasma output from the first vacuum chamber and also converges and guides it;

a third vacuum chamber which is connected to the second vacuum chamber and has a first ion optical separation means;

a fourth vacuum chamber which is connected to the third vacuum chamber and has a cell into which reaction gas is introduced; and a fifth vacuum chamber which is connected to the fourth vacuum chamber and has a second optical separation means and a detector, wherein said second vacuum chamber and said third vacuum chamber are individually pumped.

2. The inductively coupled plasma MS/MS mass analyzer according to embodiment 1, wherein said ion optical separation means separates ions according to mass-to-charge ratio.

3. The inductively coupled plasma MS/MS mass analyzer according to embodiment 1 or 2, wherein said second vacuum chamber is maintained at a pressure of 0.5 Pa or below, and said third vacuum chamber is maintained at a pressure of $1\times10^{-4}$ Pa to $2\times10^{-2}$ Pa.

4. The inductively coupled plasma MS/MS mass analyzer according to embodiments 1 through 3, wherein said fourth vacuum chamber is maintained at a pressure of $1\times10^{-5}$ Pa to 0.2 Pa.

5. The inductively coupled plasma MS/MS mass analyzer according to any of embodiments 1 through 4, wherein said first vacuum chamber is evacuated by a rotary pump, and said second vacuum chamber through said fifth vacuum chamber are evacuated by turbomolecular pumps or oil diffusion pumps.

6. The inductively coupled plasma MS/MS mass analyzer according to any of embodiments 1 through 5, wherein said third vacuum chamber and said fifth vacuum chamber are connected to each other via a duct.

7. The inductively coupled plasma MS/MS mass analyzer according to any of embodiments 1 through 6, wherein said second vacuum chamber and said third vacuum chamber are evacuated by a single split flow turbomolecular pump.

8. The inductively coupled plasma MS/MS mass analyzer according to any of embodiments 1 through 6, wherein said third vacuum chamber and said fourth vacuum chamber are evacuated by a single split flow turbomolecular pump.

9. The inductively coupled plasma MS/MS mass analyzer according to any of embodiments 1 through 6, wherein said fourth vacuum chamber and said fifth vacuum chamber are evacuated by a single split flow turbomolecular pump.

10. The inductively coupled plasma MS/MS mass analyzer according to any of embodiments 1 through 5, wherein said second vacuum chamber and said third vacuum chamber are evacuated by a single split flow turbomolecular pump, and said fourth vacuum chamber and said fifth vacuum chamber are evacuated by a single split flow turbomolecular pump.

11. The inductively coupled plasma MS/MS mass analyzer according to any of embodiments 1 through 10, wherein said rotary pump also serves as a foreline pump of the pumps that pump said second vacuum chamber through said fifth vacuum chamber.

12. The inductively coupled plasma MS/MS mass analyzer according to any of embodiments 1 through 11, wherein the distance from the partition between said second vacuum pump and said third vacuum pump to said first ion optical separation means is from about 1 mm to about 7 mm.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. An inductively coupled plasma MS/MS mass analyzer, comprising:

a first vacuum chamber for drawing plasma containing an ionized sample produced at atmospheric pressure into vacuum and for outputting the plasma;

a second vacuum chamber comprising a device for extracting ions containing an analysis target as a beam from the plasma outputted from the first vacuum chamber and for converging and guiding the beam;

a third vacuum chamber connected to the second vacuum chamber and comprising a first ion optical separation device;

a fourth vacuum chamber connected to the third vacuum chamber and comprising a cell into which reaction gas is introduced; and a fifth vacuum chamber connected to the fourth vacuum chamber and comprising a second optical separation device and a detector, wherein said second vacuum chamber and said third vacuum chamber are individually pumped.

2. The inductively coupled plasma MS/MS mass analyzer according to claim 1, wherein said ion optical separation device separates ions according to mass-to-charge ratio.

3. The inductively coupled plasma MS/MS mass analyzer according to claim 1, wherein said second vacuum chamber is maintained at a pressure of 0.5 Pa or below, and said third vacuum chamber is maintained at a pressure of $1\times10^{-4}$ Pa to $2\times10^{-2}$ Pa.

4. The inductively coupled plasma MS/MS mass analyzer according to claim 3, wherein said fourth vacuum chamber is maintained at a pressure of $1\times10^{-5}$ Pa to 0.2 Pa.

5. The inductively coupled plasma MS/MS mass analyzer according to claim 1, comprising a rotary pump for pumping said first vacuum chamber, and one or more turbomolecular pumps or oil diffusion pumps for evacuating said second vacuum chamber, said third vacuum chamber, said fourth vacuum chamber, and said fifth vacuum chamber.

6. The inductively coupled plasma MS/MS mass analyzer according to claim 1, wherein said third vacuum chamber and said fifth vacuum chamber are connected to each other via a duct.

7. The inductively coupled plasma MS/MS mass analyzer according to claim 1, comprising a single split flow turbomolecular pump for evacuating said second vacuum chamber and said third vacuum chamber.

8. The inductively coupled plasma MS/MS mass analyzer according to claim 1, comprising a single split flow turbomolecular pump for evacuating said third vacuum chamber and said fourth vacuum chamber.

9. The inductively coupled plasma MS/MS mass analyzer according to claim 1, comprising a single split flow turbomolecular pump for evacuating said fourth vacuum chamber and said fifth vacuum chamber.

10. The inductively coupled plasma MS/MS mass analyzer according to claim 1, comprising a first single split flow turbomolecular pump for evacuating said second vacuum chamber and said third vacuum chamber, and a second single split flow turbomolecular pump for evacuating said fourth vacuum chamber and said fifth vacuum chamber.

11. The inductively coupled plasma MS/MS mass analyzer according to claim 5, wherein said rotary pump is positioned such that the rotary pump serves as a foreline pump of the one or more turbomolecular pumps or oil diffusion pumps.

12. The inductively coupled plasma MS/MS mass analyzer according to claim 1, wherein the distance from a partition between said second vacuum pump and said third vacuum pump to said first ion optical separation device is from about 1 mm to about 7 mm.

* * * * *